United States Patent
Hassine et al.

(10) Patent No.: US 9,792,144 B2
(45) Date of Patent: Oct. 17, 2017

(54) METHODS AND APPARATUS TO MANAGE MONITORING AGENTS

(71) Applicant: VMWare, Inc., Palo Alto, CA (US)

(72) Inventors: Lital Hassine, Herzliya (IL); Scott Feldstein, Palo Alto, CA (US); Moran Shimron, Mevaseret Zion (IL)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 15/186,978

(22) Filed: Jun. 20, 2016

(65) Prior Publication Data
US 2016/0321098 A1 Nov. 3, 2016

Related U.S. Application Data

(63) Continuation of application No. 14/319,326, filed on Jun. 30, 2014, now abandoned.

(51) Int. Cl.
*G06F 9/455* (2006.01)
*G06F 9/445* (2006.01)
(Continued)

(52) U.S. Cl.
CPC .......... *G06F 9/45558* (2013.01); *G06F 8/61* (2013.01); *G06F 9/50* (2013.01); *G06F 11/30* (2013.01);
(Continued)

(58) Field of Classification Search
CPC .......... G06F 8/61; G06F 9/45558; G06F 9/50; G06F 11/30; G06F 2009/4557;
(Continued)

(56) References Cited

U.S. PATENT DOCUMENTS 6,708,215 B1 3/2004 Hingorani et al.
7,082,464 B2 7/2006 Hasan et al.
(Continued)

FOREIGN PATENT DOCUMENTS

EP 2562973 2/2013

OTHER PUBLICATIONS

United States Patent and Trademark Office, "Non-Final Office Action," issued in connection with U.S. Appl. No. 14/231,018, Mar. 16, 2016, 17 pages.
(Continued)

*Primary Examiner* — Ted T Vo

(57) ABSTRACT

Methods and apparatus to manage a dynamic deployment environment including one or more virtual machines. A disclosed example involves: (a) automatically scanning the virtual machines in the deployment environment to identify a service installed on any of the virtual machines; (b) automatically determining whether the identified service corresponds to a service monitoring rule; (c) when the service corresponds to the service monitoring rule, automatically determining whether a monitoring agent identified by the service monitoring rule is installed on the virtual machines on which the service is installed; (d) when the monitoring agent identified by the service monitoring rule is not installed on the virtual machines on which the service is installed, automatically installing the monitoring agent on the virtual machines on which the service is installed; and (e) when the monitoring agent identified by the service monitoring rule is installed on the virtual machines on which the service is installed, automatically configuring the monitoring agent to monitor the service in accordance with the service monitoring rule on the virtual machines on which the service is installed, wherein (a), (b), (c), (d) and (e) are repeatedly performed without human intervention.

18 Claims, 7 Drawing Sheets

(51) Int. Cl.
  *G06F 9/50* (2006.01)
  *G06F 11/30* (2006.01)
(52) U.S. Cl.
  CPC .............. *G06F 2009/4557* (2013.01); *G06F 2009/45575* (2013.01); *G06F 2009/45591* (2013.01); *G06F 2009/45595* (2013.01)
(58) Field of Classification Search
  CPC . G06F 2009/45575; G06F 2009/45591; G06F 2009/45595
  USPC .......................................................... 718/1
  See application file for complete search history.

(56) References Cited

U.S. PATENT DOCUMENTS

| | | |
|---|---|---|
| 7,805,419 B2 | 9/2010 | Newman |
| 7,930,381 B2 | 4/2011 | Attanasio et al. |
| 8,209,687 B2 | 6/2012 | Yuyitung et al. |
| 8,285,929 B2 | 10/2012 | Kaneko et al. |
| 8,448,170 B2 | 5/2013 | Wipfel et al. |
| 8,620,851 B2 | 12/2013 | Brown et al. |
| 8,650,562 B2 | 2/2014 | Hou et al. |
| 8,789,022 B2 | 7/2014 | Neogi |
| 8,826,274 B2 | 9/2014 | Moriki et al. |
| 8,874,704 B2 | 10/2014 | Nath et al. |
| 8,914,768 B2 | 12/2014 | Karnik et al. |
| 9,003,406 B1 | 4/2015 | Hodge et al. |
| 9,015,712 B1 | 4/2015 | Hodge et al. |
| 9,043,786 B1 | 5/2015 | Hodge et al. |
| 9,047,133 B2 | 6/2015 | Winterfeldt et al. |
| 9,052,961 B2 | 6/2015 | Mangtani et al. |
| 9,237,060 B2 | 1/2016 | Wu et al. |
| 2003/0028624 A1 | 2/2003 | Hasan et al. |
| 2005/0203921 A1 | 9/2005 | Newman et al. |
| 2008/0134175 A1 | 6/2008 | Fitzgerald et al. |
| 2009/0144420 A1 | 6/2009 | Attanasio et al. |
| 2009/0265707 A1 | 10/2009 | Goodman et al. |
| 2011/0060878 A1 | 3/2011 | Kaneko et al. |
| 2011/0126207 A1 | 5/2011 | Wipfel et al. |
| 2011/0307617 A1 | 12/2011 | Wu et al. |
| 2012/0066487 A1 | 3/2012 | Brown et al. |
| 2012/0284713 A1 | 11/2012 | Ostermeyer et al. |
| 2012/0331388 A1 | 12/2012 | Nedelcu et al. |
| 2013/0219363 A1 | 8/2013 | Wu et al. |
| 2013/0283102 A1 | 10/2013 | Krajec et al. |
| 2014/0019597 A1 | 1/2014 | Nath et al. |
| 2014/0040656 A1 | 2/2014 | Ho et al. |
| 2014/0237472 A1 | 8/2014 | Adogla et al. |
| 2014/0380308 A1 | 12/2014 | Hassine et al. |
| 2015/0154039 A1 | 6/2015 | Zada et al. |
| 2015/0242204 A1* | 8/2015 | Hassine .............. H04L 41/5045 717/121 |
| 2015/0378708 A1* | 12/2015 | Nagaraja ................... G06F 8/60 717/177 |
| 2015/0378763 A1 | 12/2015 | Hassine et al. |

OTHER PUBLICATIONS

United States Patent and Trademark Office, "Final Office Action," issued in connection with U.S. Appl. No. 14/191,020, Feb. 10, 2016, 24 pages.
Novell, "A Blueprint for Better Management from the Desktop to the Data Center", Feb. 2007, Novell, Inc., 17 pages.
Hu et al. "JAVA Blueprint Procedure Pattern", 2013 IEEE 4th International Electronics Information and Emergency Communication (ICEIEC), Nov. 15-17, 2013, 5 pages.
VMWare, Inc., "Using VMware vFabric Application Director—vFabric Application Director 5.0," 2012, 164 pages.
VMWare, Inc.,"vCloud Director User's Guide—vCloud Director 5.1," 2010-2012, 126 pages.
VMWare, Inc., "Infrastructure Navigator User's Guide—vCenter Infrastructure Navigator 2.0.0," 2012-2013, 38 pages.
Puppet Labs, "What is Puppet?"<http://info.puppetlabs.com/download-pe.html>, 2014, 4 pages.
Puppet Labs, "Puppet Enterprise," <http://info.puppetlabs.com/download-pe.html>, 2014, 4 pages.
Mitchell, "DynamicOps Cloud Development Kit: Overview and Concepts—Extending Your Cloud to New Use Cases," DynamicOps.com, Jun. 2012, 12 pages.
Bourdeau, "DynamicOps Extensibility Overview: Enable, Adapt, and Extend your Infrastructure into a Business Relevant Cloud," DynamicOps.com, May 2012, 12 pages.
VMWare, "vCloud Automation Center Introduced by VMware: vCloud Automation Center—leverages vCD to provision applications to virtual datacenters," retrieved from <http://www.vladan.fr/vcloud-automation-center-introduced-by-vmware/>, retrieved on Nov. 30, 2012, 7 pages.
DynamicOps, "DynamicOps Cloud Automation Center Design Center Data Sheet," DynamicOps.com, Apr. 12, 2011, retrieved from <http://www.dabcc.com/article.aspx?id=17668>, retrieved on Mar. 27, 2014, 6 pages.
VMWare, Inc, "VMware vCenter Infrastructure Navigator," 2013, 1 page.
VMWare, Inc, "VMware vFabric™ Application Director—Application Provisioning for Hybrid Clouds," 2013, 2 pages.
VFabric Documentation Center, "Introduction to Hyperic Monitoring," vFabric Hyperic Overview, retrieved from <http://pubs.vmware.com/vfabric5/index.jsp?topic=/com.vmware.vfabric.hyperic.4.6/Introduction_to_Hyperic_Monitoring.html>, retrieved May 12, 2014, 3 pages.
International Searching Authority, "International Search Report and Written Opinion," issued in connection with Application No. PCT/US2014/067322, Feb. 17, 2015, 14 pages.
United States Patent and Trademark Office, "Non-Final Office Action," issued in connection with U.S. Appl. No. 14/191,020, Jul. 30, 2015, 14 pages.
International Searching Authority, "International Preliminary Report on Patentability," issued in connection with Application No. PCT/US2014/067322, Jun. 7, 2016, 9 pages.
United States Patent and Trademark Office, "Final Office Action," issued in connection with U.S. Appl. No. 14/319,326, Mar. 29, 2016, 7 pages.
United States Patent and Trademark Office, "Non-Final Office Action," issued in connection with U.S. Appl. No. 14/319,326, Sep. 25, 2015, 9 pages.
IBM, "Tivoli IBM Tivoli Monitoring for Virtual Servers: Vmware VI Agent", version 6.2.1, 2009, International Business Machines Corporation, 207 pages.
MSDN Blogs, "How to Configure VM Monitoring in Windows Server 2012—Clustering and High-Availability," Apr. 18, 2012, retrieved from <http://blogs.msdn.com/b/clustering/archive/2012/04/18/10295158.aspx>, retrieved on Sep. 18, 2015, 8 pages.
Microsoft, "Add-Cluster VM MonitoredItem—Windows Server 2012 R2 and Windows 8.1," Oct. 17, 2013, 11 pages.

* cited by examiner

METHODS AND APPARATUS TO MANAGE MONITORING AGENTS

CROSS REFERENCE TO RELATED APPLICATIONS

This patent arises from a continuation of U.S. patent application Ser. No. 14/319,326, filed Jun. 30, 2014. U.S. patent application Ser. No. 14/319,326 is hereby incorporated herein by reference in its entirety.

FIELD OF THE DISCLOSURE

This disclosure relates generally to virtual machine computing and, more particularly, to methods and apparatus to manage monitoring agents in a virtual machine computing cloud.

BACKGROUND

"Infrastructure-as-a-Service" (also commonly referred to as "IaaS") generally describes a suite of technologies provided by a service provider as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and networking resources. By providing ready access to the hardware resources required to run an application, the cloud computing platform enables developers to build, deploy, and manage the lifecycle of a web application (or any other type of networked application) at a greater scale and at a faster pace than before.

Deployment tools currently in use are usually a patchwork of various software products from different vendors and/or homegrown solutions. Such tools are generally process-driven with heavy reliance on custom scripts and property files. Traditional deployment tools are also not configured for automation with cloud computing platforms that dynamically provision virtual computing resources.

BRIEF DESCRIPTION OF THE DRAWINGS

Wherever possible, the same reference numbers will be used throughout the drawing(s) and accompanying written description to refer to the same or like parts.

DETAILED DESCRIPTION

Figure 1:
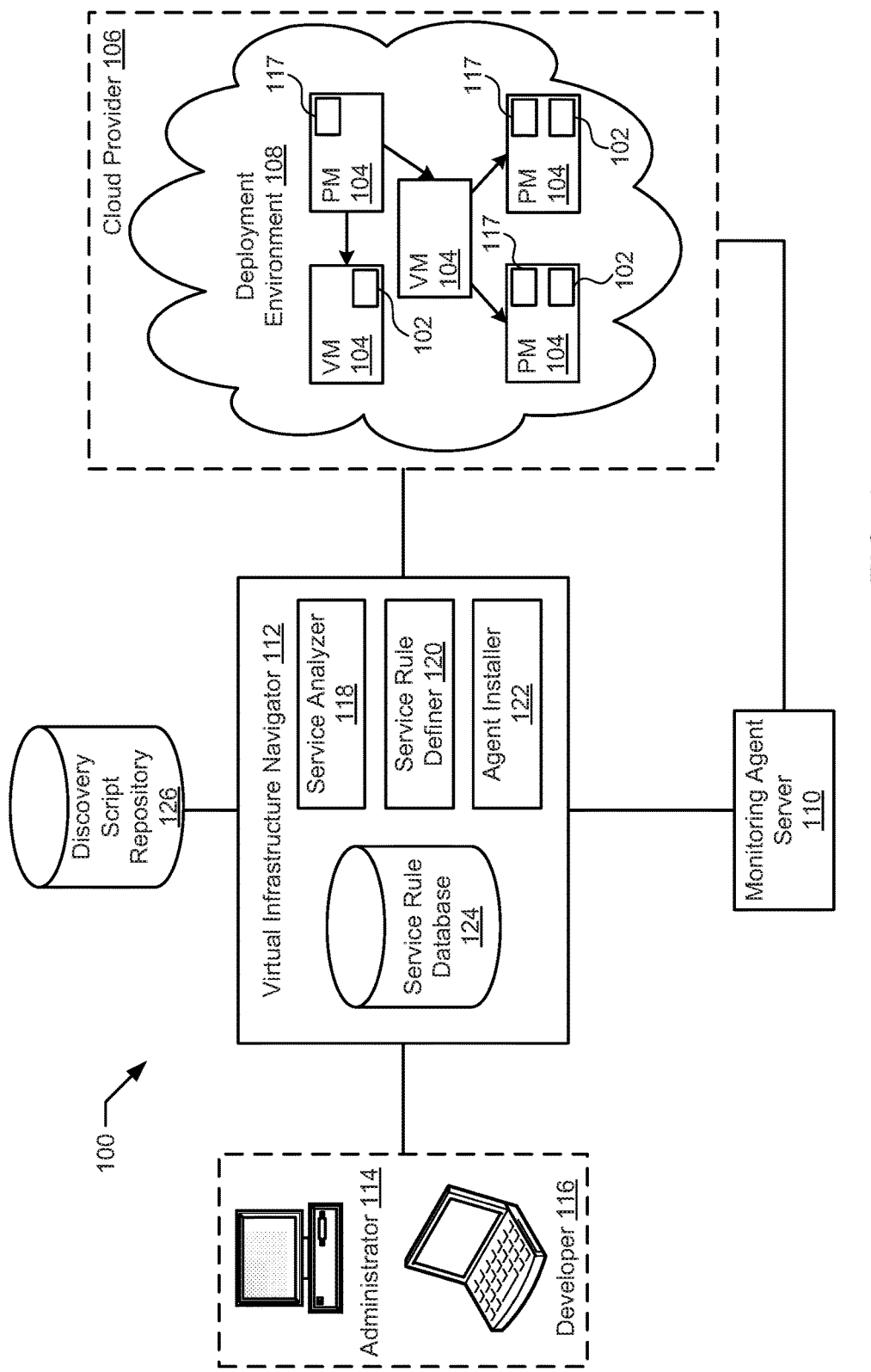
FIG. 1 is a block diagram of an example system constructed in accordance with the teachings of this disclosure for automatically managing monitoring agents.

Monitoring agents are installed on computing units (e.g., virtual machines (VM), physical machines (PM), etc.) to, for example, monitor the performance of applications. Because monitoring agents are resource intensive, virtual infrastructure administrators typically install monitoring agents on computing units running important services (e.g., web servers, application servers, database servers, application components, etc.) that need to be monitored (and typically do not install monitoring agents on other less important computing units). Currently, the virtual infrastructure administrators manually install and configure monitoring agents on the computing units with services to be monitored. Because virtual environments are dynamic, applications (e.g., multi-tiered applications) and services may be scaled out automatically (e.g., by adding additional resources, services, applications, etc.). The automatic scaling of the applications and the services may require the installation of new monitoring agent(s) across new computing units and/or may require existing monitoring agents to be reconfigured for the new services and/or applications. Additionally, as services and/or applications are moved and/or removed, monitoring agents may require reconfiguration or removal from a computing unit.

To accommodate management of monitoring agents (e.g., without user intervention), in examples disclosed herein, a user (e.g., the virtual infrastructure administrator) defines service rules. The service rules may, for example, define the service(s) that require monitoring agents, the computing units and/or groups to monitor for the service(s), and/or criteria for installation (e.g., install/configure a monitoring agent for every detected instance of a service, install a monitoring agent only when a service is newly installed, etc.). The service rule may also define configuration information (e.g., IP address, installation source, credentials, etc.) relating to a monitoring agent server, service metrics to be reported to the monitoring agent server, and/or configuration properties for the monitoring agent server.

A virtual infrastructure navigator (VIN), as disclosed herein, may automatically discover services executing on computing units specified by the service rules. Example systems for automatically discovering services are discussed in U.S. application Ser. No. 14/231,018 entitled "Methods and Apparatus to Automatically Configure Monitoring of a Virtual Machine," which is incorporated by reference herein in its entirety. If a discovered service satisfies a service rule (e.g., matches the defined application and/or service, is running on a specified computing unit, and meets the specified criteria), an agent installer installs a monitoring agent on a target computing unit and/or configures the monitoring agent according to the service rule.

In some examples disclosed herein, the VIN causes discovery scripts to be executed by the computing units. In some such examples, the VIN detects changes in the configuration (e.g., detects that a service has been installed, detects that a service has been removed, etc.) of the computing units. In some such examples, automatically installing a monitoring agent on a computing unit is triggered by the VIN detecting changes in the configuration of the computing unit.

In some examples disclosed herein, the VIN automatically discovers the installation of multi-tiered applications. In some such examples, the VIN identifies services installed as part of the multi-tiered applications, identifies computing units corresponding to the services, and installs and/or configures monitoring agents on computing units with services that satisfy one or more service rules.

In some examples disclosed herein, the VIN automatically detects when a service has been removed from a computing unit. The example VIN determines whether, according to a service rule, a monitoring agent was installed and/or configured for the service on the computing unit. In some such examples, without user intervention, the monitoring agent is reconfigured so that the monitoring agent does not attempt to monitor the removed service. Additionally or alternatively, the monitoring agent is removed from the computing unit. In this manner, unnecessary monitoring agents are removed from the deployment environment and resources are freed.

Example methods and apparatus disclosed herein facilitate the automatic management of monitoring agents deployed in a deployment environment. Example methods and apparatus enable a user (e.g., a virtual infrastructure administrator, etc.) to define service rules for services and/or applications that are monitored. In some example methods and apparatus, a VIN (e.g., vCenter™ Infrastructure Navigator™, a commercially available product from VMWare®, Inc.) or similar component automatically detects services running on a computing unit (e.g., a virtual machine, a physical machine, etc.). In some examples, the automatically detected services are compared to the defined service rules. If an automatically detected service satisfies a service rule (e.g., the automatically detected service is identified in the service rule), a monitoring agent is installed and/or configured on the computing unit running the service without further intervention from the user.

Example methods disclosed herein include determining if a first service is installed on computing unit (e.g., a virtual machine, a physical machine, etc.) that corresponds to a service rule, the service rule to specify a service identifier and configuration for a monitoring agent, determining if the virtual machine includes the monitoring agent, and in response to determining that the first service matches the service identifier and determining that the monitoring agent is not installed on the virtual machine, initiating installation of the monitoring agent on the virtual machine.

Example apparatus disclosed herein include a service analyzer to determine whether if a virtual machine has a first service installed that corresponds to a service rule and to determine if the virtual machine has a monitoring agent corresponding to the first service, the service rule to specify a service identifier and a configuration for the monitoring agent, and an agent installer to, in response to the first service matching the service identified specified by the service rule and the monitoring agent not installed on the virtual machine, initiate installation of the monitoring agent on the virtual machine.

As used herein, the term "node" or "logical node" refers to a computing unit or a cluster of computing units defined in a service rule to be monitored for a specified service.

As used herein, the term "service" refers to scripted software that can be installed on a computing unit and may be reused in multiple applications.

As used herein, the term "properties" refers to configuration variables used by scripts to set parameters on a script and run various configurations. For example, setting an installation path property value causes installation scripts to use the property to specify the path to use to install a monitoring agent.

As used herein, the term "deployment environment" refers to a computing environment in a cloud provider. For example, separate deployment environments may be used for development, testing, staging, and/or production. A cloud provider can have one or multiple deployment environments.

FIG. 1 illustrates an example system 100 for automatically managing monitoring agents 102 deployed across computing units 104 (e.g., virtual machines (VM), physical machines (PM), etc.) managed by a cloud platform provider 106 (also referred to herein as a "cloud provider"). The example system 100 includes a monitoring agent server 110 and a virtual infrastructure navigator (VIN) 112, which may be used to automatically deploy, configure, and/or remove monitoring agents 102. The system 100 of the illustrated example includes a discovery script repository 126 in communication with the VIN 112.

The example cloud computing platform provider 106 provisions virtual and/or physical computing resources (e.g., the computing units 104) to provide the deployment environments 108 in which the administrator 114 and/or developer 116 can deploy multi-tiered application(s). One particular example of a deployment environment that may be used to implement the deployment environments 112 of FIG. 1 is vCloud DataCenter cloud computing services available from VMWare®, Inc. The example cloud computing platform provider 106 of FIG. 1 may be used to provide multiple deployment environments 108, for example, for development, testing, staging, and/or production of applications. The administrator 114 and/or the developer 116 may access services from the cloud computing platform provider 106, for example, via REST (Representational State Transfer) APIs (Application Programming Interface) and/or via any other client-server communication protocol. One particular implementation of a REST API for cloud computing services is vCloud® Director API available from VMWare®, Inc.

In the example illustrated in FIG. 1, the example deployment environment 108 includes multiple computing units 104 (e.g., virtual machines (VM) and physical machines (PM)). In the illustrated example of FIG. 1, services 117 (e.g., MySql server, e-mail server, etc.) are deployed across the example computing units 104 in the deployment environment 108. In some examples, computing units 104 are added and/or removed from the deployment environment 108 by the administrator 114 and/or the developer 116. During the use of a multi-tiered application (e.g., an application with multiple services 117 spread across one or more computing units 104), the multi-tiered application may be dynamically scaled up (e.g., by adding services 117 and/or computing units 104 associated with the application) or scaled down (e.g., by removing services 117 and/or computing units 104 associated with the application) to add or remove resources as required by the multi-tiered applications.

In the example illustrated in FIG. 1, the VIN 112 includes a service analyzer 118, a service rule definer 120, an agent installer 122, and a service rule database 124. The example service rule database 124 is provided to store and/or manage service rules created, deleted, and/or modified by the example service rule definer 120.

In the example illustrated in FIG. 1, the administrator 114 and/or the developer 116 use the service rule definer 120 to maintain the service rule database 124 by creating, modifying, and/or deleting service rules. In the illustrated example, the service rule database 124 stores the service rules generated via the service rule definer 120. In some examples, the service rule database 124 may be any data structure suitable for storing data, such as a relational database (e.g., a MySQL database), or an Extensible Markup Language (XML) file, etc. The example service rule definer 120 is to create, delete, and/or modify service rules used by the example service analyzer 118 to determine whether an example monitoring agent 102 is to be installed, removed, and/or configured on an example computing unit 104. Additionally or alternatively, service rules may be imported into the service rule database 124 and may be subsequently maintained by the service rule definer 120.

In the example illustrated in FIG. 1, the service analyzer 118 is to monitor services deployed on computing units 104 in the example deployment environment 108, to determine whether an example monitoring agent 102 is to be installed, removed, and/or configured on an example computing unit 104. The example service analyzer 118 may additionally or alternatively direct the example agent installer 122 to install, remove, and/or configure an example monitoring agent 102 on an example computing unit 104. The example service analyzer 118 selects and/or accesses discovery script(s) stored in the example discovery script repository 126. In some examples, the discovery script repository 126 may be any data structure suitable for storing data, such as a relational database (e.g., a MySQL database), or an Extensible Markup Language (XML) file, etc. In some examples, the discovery scripts are sets of instructions to be executed by computing units 104 analyzer and/or report the configuration of the computing unit 104. The service analyzer 118 of the illustrated example causes the discovery script(s) to be executed on the computing units 104 in the deployment environment 108 to detect changes in the configuration (e.g., detects installation of new services, detects removal of services, etc.) of the computing units 104 in the deployment environment 108. Additionally or alternatively, the computing units 104, from time to time, report the services installed on the computing units 104 to the VIN 112 and/or the service analyzer 118.

The example service analyzer 118 compares the service(s) 117 running on the example computing units 104 to the service rules in the service rule database 124. If a service satisfies a service rule (e.g., meets the criteria defined in the service rule), the example service analyzer 118 directs the example agent installer 112 to initiate installation and/or configuration of an example monitoring agent 102 on example the computing unit 104 corresponding to the service. For example, a service 117 may satisfy a service rule when the service matches a service identifier included in the service rule. In some examples, the service analyzer 118 also detects when services have been removed from the computing units 104. In some such examples, the example service analyzer 118 directs the example agent installer 122 to initiate removal of the example monitoring agent 102 from the corresponding example computing unit 104 (e.g., when no other service is being monitored by the example monitoring agent 102) and/or to reconfigure the example monitoring agent 102 (e.g., when another service is being monitored by the example monitoring agent 102). In some examples, the service analyzer 118 does not respond to detecting that a service 117 has been removed from a computing unit 104 (e.g., does not remove the example monitoring agent).

In the example illustrated in FIG. 1, the agent installer 122 initiates installation, configuration and/or removal of a monitoring agent 102 from the computing unit 104 when directed by the service analyzer 112 according to a service rule. The example service rule identifies an initial configuration of the example monitoring agent 102 installed on the example target computing unit 104. In some examples, the service rule defines a configuration for the agent server 110. An example configuration includes an internet protocol (IP) address of the monitoring agent server 110, an agent user name, an agent user password, an installation package location, a Linux platform installation directory, a Windows platform installation directory, an agent version, configuration of the agent 102 as a service, a secure connection configuration to the monitoring agent server 110, a performance agent server port, a performance agent secure server port, a performance agent port, a unidirectional configuration (e.g., configuring either the monitoring agent 102 or the monitoring agent server 110 to initiate all communications, or configuring the monitoring agent 102 and the monitoring agent server 110 to initiate respective communications), and/or a checksum hash value. In some examples, the example service rule defines which metrics supported by the example monitoring agent 102 are to be monitored and reported to the example monitoring agent server 110.

After the example agent installer 122 of FIG. 1 causes the installation and/or configuration of the monitoring agents 102 on the appropriate computing units 104, the example monitoring agent server 110 of FIG. 1 automatically registers the monitoring agents 102 on the computing units 104 (e.g., based on how the monitoring agents 102 are configured to communicate with the example monitoring agent server 110). Additionally, example agent installer 122 configures the computing units 104 to be monitored according to a management or monitoring policy and/or performs any other monitoring tasks associated with the service. For example, the computing units 104 may be configured to allow the monitoring agent 102 to communicate with the monitoring agent server 110 (e.g., configure permissions on the computing unit 104, configure firewall of the computing unit 104, etc.).

In some examples, the example monitoring agent server 110 of FIG. 1 automatically organizes the monitoring of the services. For example, the monitoring agent server 110 may group monitoring of the services 117 to enable ease of access by the administrator 114 and/or the developer 116. In some examples, the monitoring agent server 110 may group the services 117 installed on the example computing units 104 of FIG. 1 for access by the administrator 114 in association with a multi-tiered application. In some examples, the monitoring agent server 110 may group monitoring agents 102 on the example computing units 104 that are associated with email server services. In such an example, the administrator 116 may then access or view performance information monitored by the monitoring agents 102 for the email servers by selecting an email server group in a monitoring agent management interface (e.g., vCenter™ Hyperic® available from VMWare®, Inc.). In some examples, the monitoring agent management interface may be accessed via the monitoring agent server 110.

Figure 2:
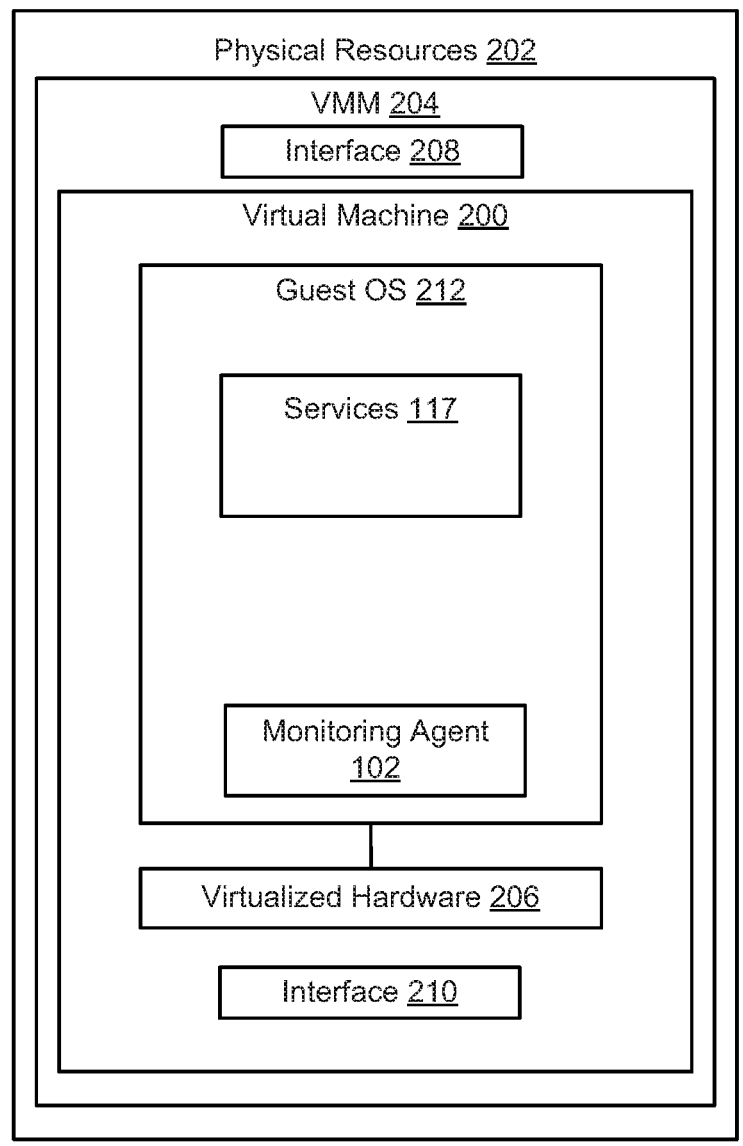
FIG. 2 is a block diagram of an example virtual machine that may be analyzed by the example system of FIG. 1 to determine whether to install and/or remove a monitoring agent to monitor the virtual machine.

FIG. 2 is a block diagram of an example implementation of a virtual machine (VM) 200 executing within the development environment 108 of FIG. 1. The example VM 200 is one of the computing units 104 that is virtualized on physical resources 202 (e.g., processor(s), memory, storage, peripheral devices, network access, etc.) provided by the example development environment 108. In the illustrated example the physical resources 202 are managed by a virtual machine manager (VMM) 204 of FIG. 2. In the illustrated example, the VMM 204 creates virtualized hardware 206 (e.g., virtualized storage, virtualized memory, virtualized processor(s), etc.) to allow multiple VMs 200 to be instantiated in the deployment environment 108 using the same physical resources 202. In some examples, the VMM 204 manages the physical resources 202 (e.g., creates the virtualized hardware 206) based on polices implemented by the administrator 114 (FIG. 1) and/or the developer 116 (FIG. 1). For example, a policy may restrict access to particular locations in memory and/or storage, etc.

In some examples, the VIN 112 of FIG. 1 is provided with credentials (e.g., a user name and password of a user or administrator authorized to access the relevant portions of the VM 200) to access the components and/or properties of the VM 200 via communications interface 208 of the VMM 204 and/or a communications interface 210. In some examples, the VIN 112 may issue text-based commands to the VM 200 to initiate discovery scripts and/or initiate installation of the monitoring agent 102. In some examples, the VMM 204 and/or the VM 200 may report information about the services installed on the VM 200 to the VIN 112.

In the example illustrated in FIG. 2, the VM 200 executes a guest operating system (OS) 212 (e.g., a Windows operating system, a Linux operating system, etc.). In the illustrated example, the guest OS 212 executes the services 117. Alternatively, the services 117 may be executed in a different environment of the VM 200 (e.g., the services 117 may execute natively on the VM 200, etc.). Additionally, the example guest OS 212 executes the example monitoring agent 102 (FIG. 1) installed by the agent installer 122 (FIG. 1) based on the service rules to monitor services installed on the VM 200. Alternatively, the monitoring agent 102 may be executed in a different environment of the VM 200 (e.g., the monitoring agent 102 may execute natively on the VM 200, the monitoring agent 102 may execute on the physical resources, etc.).

While an example manner of implementing the system 100 is illustrated in FIGS. 1 and/or 2, one or more of the elements, processes and/or devices illustrated in FIGS. 1 and/or 2 may be combined, divided, re-arranged, omitted, eliminated and/or implemented in any other way. Further, the example monitoring agents 102, the example computing units 104, the example development environment 108, the example monitoring agent server 110, the example virtual infrastructure navigator 112, the example service analyzer 118, the example service rule definer 120, the example agent installer 122, the example service rule database 124, the example VM 200, and/or, more generally, the example system 100 of FIG. 1 may be implemented by hardware, software, firmware and/or any combination of hardware, software and/or firmware. Thus, for example, any of the example monitoring agents 102, the example computing units 104, the example development environment 108, the example monitoring agent server 110, the example virtual infrastructure navigator 112, the example service analyzer 118, the example service rule definer 120, the example agent installer 122, the example service rule database 124, the example VM 200, and/or, more generally, the example system 100 of FIG. 1 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example monitoring agents 102, the example computing units 104, the example development environment 108, the example monitoring agent server 110, the example virtual infrastructure navigator 112, the example service analyzer 118, the example service rule definer 120, the example agent installer 122, the example VM 200, and/or the example service rule database 124 is/are hereby expressly defined to include a tangible computer readable storage device or storage disk such as a memory, a digital versatile disk (DVD), a compact disk (CD), a Blu-ray disk, etc. storing the software and/or firmware. Further still, the example system 100 of FIGS. 1 and/or 2 may include one or more elements, processes and/or devices in addition to, or instead of, those illustrated in FIGS. 1 and/or 2, and/or may include more than one of any or all of the illustrated elements, processes and devices.

Figure 3:
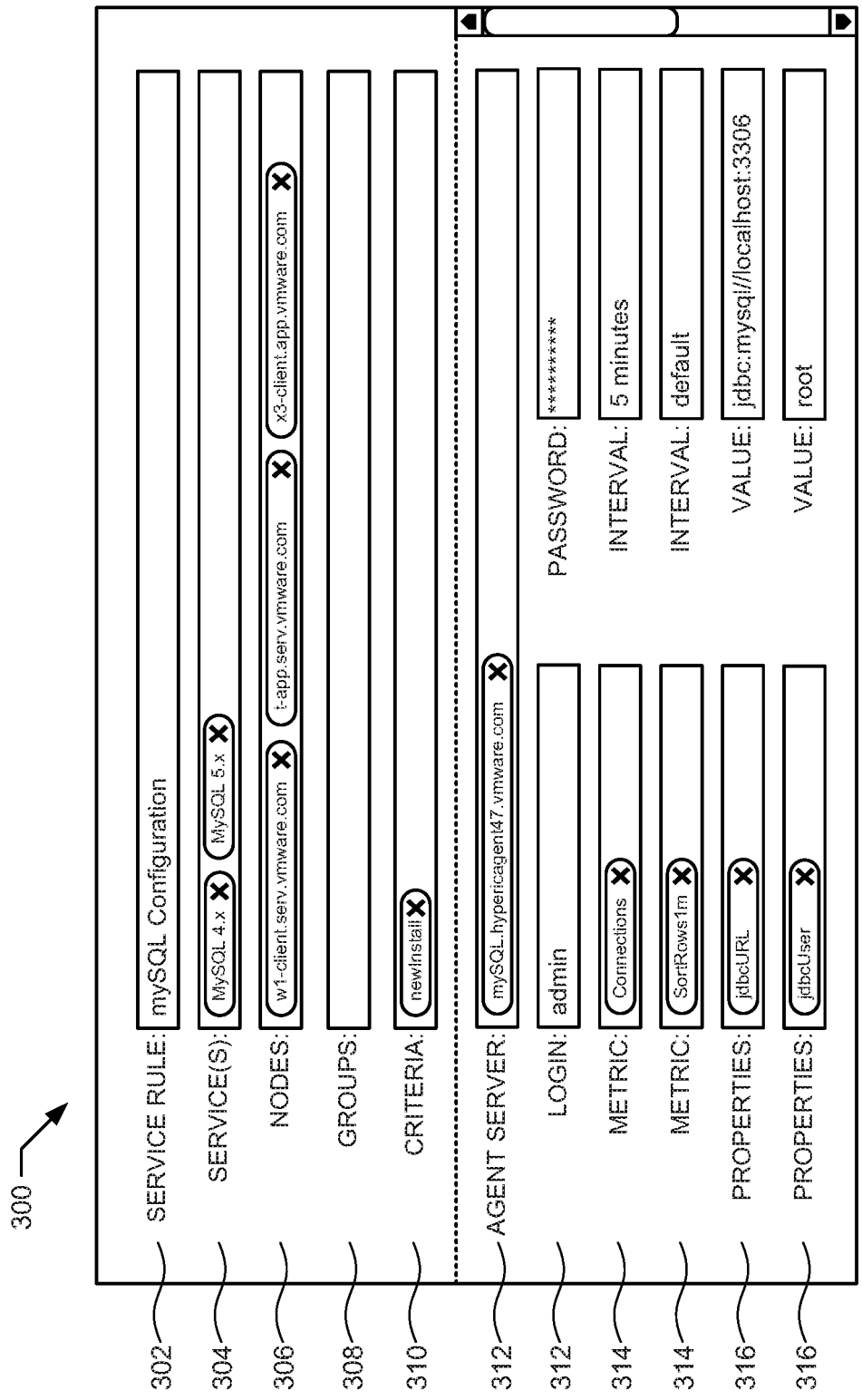
FIG. 3 illustrates an example interface that may be presented by the service rule definer of FIG. 1 to facilitate creation and/or management of a service rule.

FIG. 3 illustrates an example interface 300 that may be presented by the example service rule definer 120 of FIG. 1 (e.g., to the administrator 114 and/or the developer 116 of FIG. 1) to enable creation and/or management of a service rule. Example configuration information includes a service rule name 302, an identifier 304 of application(s) and/or service(s) to be monitored, nodes 306 to monitor for the application(s) and/or the service(s) (e.g., the application(s) and/or service(s) identified by identifier 304), group(s) 308 to monitor for the application(s) and/or the service(s) to be monitored, criteria 310, agent server configuration information 312 (e.g., agent server address, agent server credentials, etc.), metrics to be monitored 314, and/or configuration properties 316. The example configuration information 302-316 may be configured by the example administrator 114 and/or the example developer 116.

The example service rule name 302 is provided to facilitate the example administrator 114 and/or the example developer 116 to assign a name to the example service rule (e.g., in accordance with cloud provider administration policies). The identifier 304 is provided to enable the example administrator 114 and/or the example developer 116 to define one or more applications and/or services to be monitored. For example, a service rule may be defined for one or more services 117, such as, MySQL 5.x servers and MySQL 4.x servers. For example, a service rule may be defined for a multi-tiered application, such as, Exchange 2010 (e.g., including agent server configuration information 312, metrics to be monitored 314, and/or configuration properties 316 for the services related to Exchange 2010). In the illustrated example, a node field 306 and/or a group field 308 are provided to display a selection of nodes and/or groups to define the computing units (e.g., the computing units 104 of FIG. 1) to monitor for the application(s) and/or service(s) to be monitored (e.g., as identified by identifier 304). In some examples, the node field 306 and/or the group field 308 may be left blank and/or may not be provided on the interface 300 (e.g., any computing unit 104 in the development environment 108 and/or the cloud provider 106 (FIG. 1) may be monitored for the application(s) and/or service(s) to be monitored). An example criteria field 310 may be provided to allow criteria to be specified (e.g., though text input, through selection of items on a list, etc.) For example, criteria specified in the criteria field 310 may define conditions that will cause the example service analyzer 118 of FIG. 1 to signal the example agent installer 122 of FIG. 1 to initiate installation, configuration and/or removal of an example monitoring agent 102. For example, criteria may be selected in the criteria field 310 so that monitoring agents 102 are installed only in response to detecting newly installed services (e.g., services 117 of FIG. 1) (as opposed to services 117 currently installed on a computing unit 104 at the time the service rule is created). In some examples, the criteria field 310 may be left blank or may not be included interface 300 (e.g., no additional criteria is required to initiate installation and/or configuration of a monitoring agent).

One or more agent server configuration information fields 312 are provided to allow the example administrator 114 and/or the example developer 116 to define configuration information (e.g., an IP address of the example monitoring agent server 110 of FIG. 1, an agent user name, an agent user password, an installation package location, a Linux platform installation directory, a Windows platform installation directory, an agent version, configuration of the example agent 102 as a service, a secure connection configuration to the example monitoring agent server 110, a performance agent server port, a performance agent secure server port, a performance agent port, a unidirectional configuration, and/or a checksum hash value, etc.) to install and/or configure a monitoring agent 102 (e.g., to allow the automatically installed example monitoring agent 102 to communicate with the example monitoring agent server 110 of FIG. 1). In the illustrated example, one or more example metric fields 312 are provides to allow the administrator 114 and/or the developer 116 to define information to be monitored by the monitoring. In some examples, the selectable metrics in the metrics field 314 are defined according to specific services and/or applications (e.g., the services and/or the application indicated by the example identifier 304). In some examples, the administrator 114 and/or the developer 116 select one or more of the metrics 314 to be monitored and select an interval (e.g., 5 minutes, default interval defined for the metric, etc.). In the illustrated example, one or more properties 316 are provided to receive a property selection. In some examples, the available property selection is determined by the identifier 304. The example properties 316 specify parameters the example agent installer 122 uses to configure the example monitoring agent 102 according to the preferences of the administrator 114 and/or the developer 116.

Figure 4:
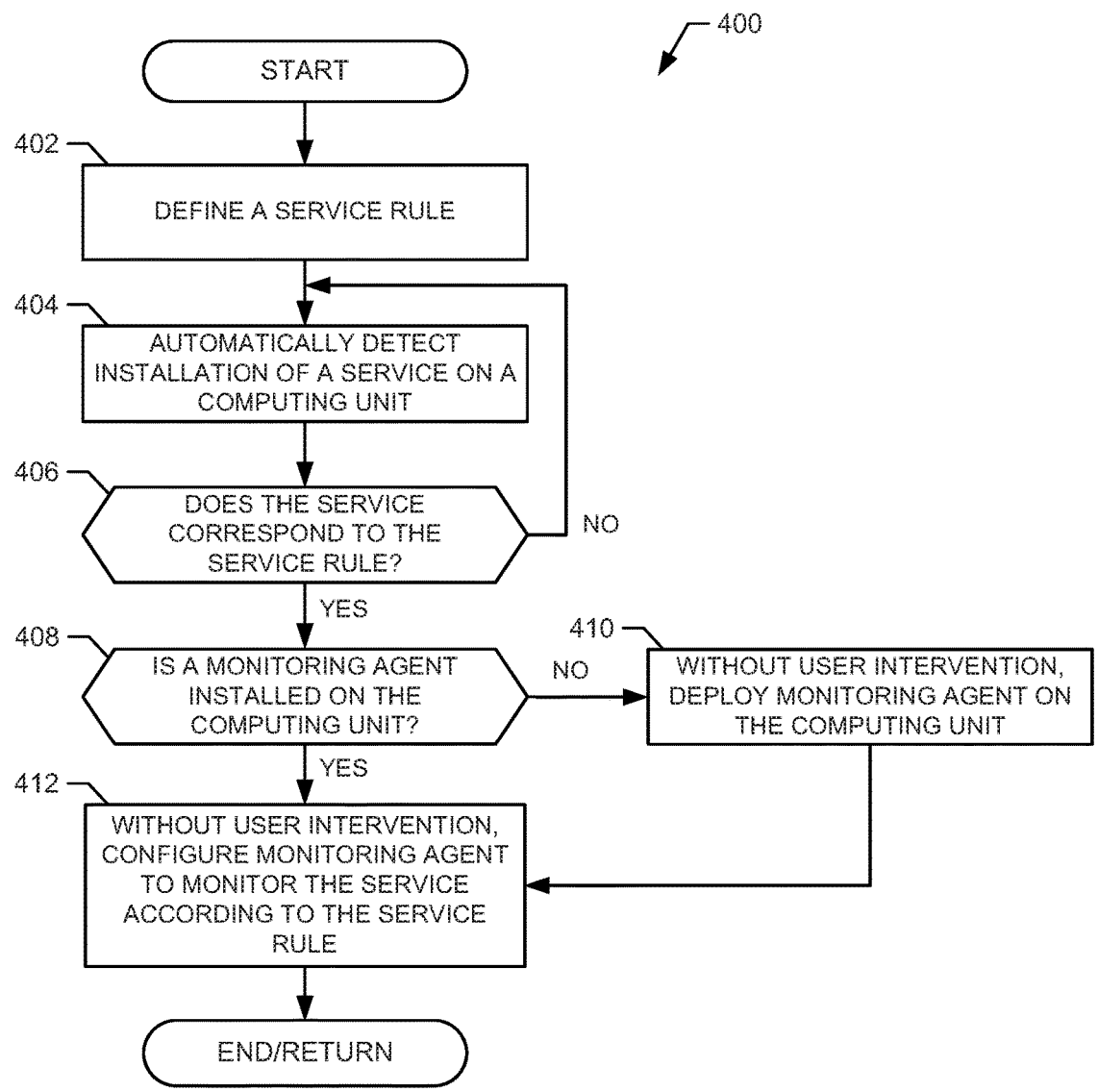
FIG. 4 is a flowchart representative of example machine readable instructions that may be executed to implement the system of FIG. 1 to automatically install a monitoring agent on a computing unit.
Figure 5:
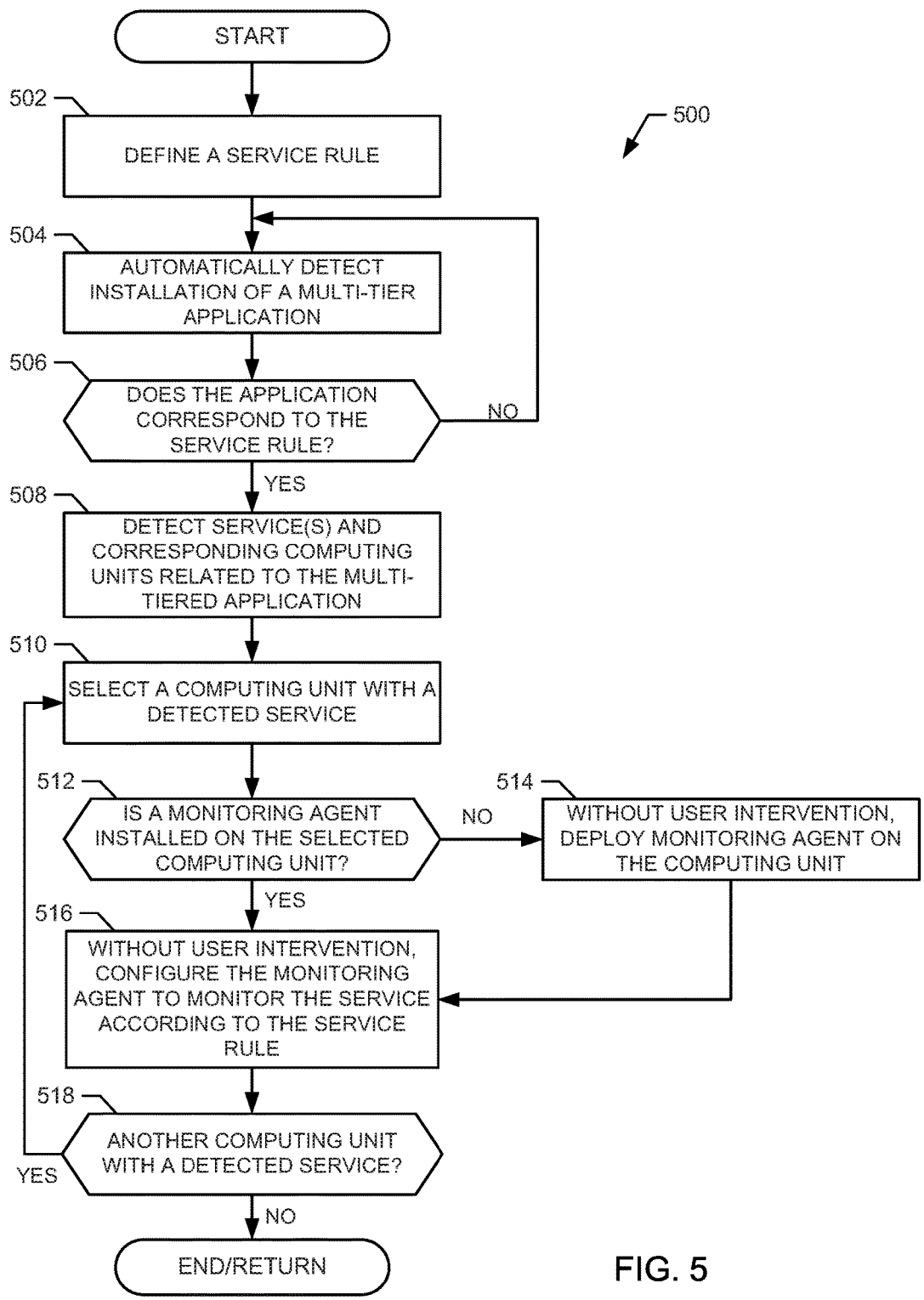
FIG. 5 is a flowchart representative of example machine readable instructions that may be executed to implement the system of FIG. 1 to automatically install monitoring agents on computing units based on a multi-tiered application.

Flowchart representative of example machine readable instructions for implementing the example VIN 112, the example monitoring agent server 110 and/or the example discovery script repository 126 of FIG. 1 are shown in FIGS. 4, 5, and/or 6. In these examples, the machine readable instructions comprise a program for execution by a processor such as the processor 712 shown in the example processor platform 700 discussed below in connection with FIG. 7. The program may be embodied in software stored on a tangible computer readable storage medium such as a CD-ROM, a floppy disk, a hard drive, a digital versatile disk (DVD), a Blu-ray disk, or a memory associated with the processor 712, but the entire program and/or parts thereof could alternatively be executed by a device other than the processor 712 and/or embodied in firmware or dedicated hardware. Further, although the example programs are described with reference to the flowcharts illustrated in FIGS. 4, 5, and 6, many other methods of implementing the example VIN 112, the example monitoring agent server 110 and/or the example discovery script repository 126 may alternatively be used. For example, the order of execution of the blocks may be changed, and/or some of the blocks described may be changed, eliminated, or combined.

As mentioned above, the example processes of FIGS. 4, 5, and/or 6 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 4, 5, and/or 6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 4 is a flowchart representative of example machine readable instructions 400 which may be executed to implement the system 100 of FIG. 1 to automatically install a monitoring agent (e.g., the example monitoring agent 102 of FIGS. 1 and 2) on a computing unit (e.g., the example computing unit 104 of FIG. 1 and/or the example VM 200 of FIG. 2). Initially, at block 402, the service rule definer 120 (FIG. 1) defines a service rule. In some examples, the example service rule definer 120 defines a service rule after receiving input from the administrator 114 (FIG. 1) and/or the developer 116 (FIG. 1) via the example interface 300 (FIG. 3). At block 404, the example service analyzer 118 (FIG. 1) automatically detects a service (e.g., the example service 117 of FIG. 1) installed on a computing unit 104. At block 406, the example service analyzer 118 determines whether the example service 117 detected at block 404 satisfies the example service rule defined at block 402. In some examples, the service 117 satisfies the service rule if the service corresponds to an identifier of service(s) to be monitored (e.g. the identifier 304 of FIG. 3) defined in the service rule. Additionally or alternatively, the service 117 say satisfy the service rule if the computing unit 104 on which the service 117 is installed corresponds to a computing unit 104 specified by nodes and/or groups (e.g., specified by the example node field 306 and/or the example group field 308 of FIG. 3) defined in the service rule. Additionally or alternatively, the service 117 may satisfy the service rule if the criteria (e.g., the criteria specified in the criteria field 310 of FIG. 3) defined by the service rule is met (e.g., the service 117 is newly installed on the computing unit 104, etc.). If the service 117 satisfies the service rule, program control advances to block 408. Otherwise, if the service 117 does not satisfy the service rule, program control returns to block 404.

At block 408, the example service analyzer 118 determines whether a monitoring agent (e.g., the example monitoring agent 102 of FIG. 1) is installed on the computing unit 104 corresponding to the service 117 detected at block 404. If a monitoring agent 102 is not installed on the computing unit 104, program control advances to block 410. Otherwise, program control advances to block 412. At block 410, the example agent installer 122 (FIG. 1) initiates installation of the example monitoring agent 102 on the computing unit 104 corresponding to the service 117 detected at block 404. In some examples, the agent installed 122 initiates the installation of the monitoring agent 102 without intervention from a user (e.g., the administrator 114 or the developer 116, etc.). Program control then advances to block 412. At block 412, the agent installer 122 configures the monitoring agent 102 according to the configuration information 312-316 (FIG. 3) defined in the service rule defined at block 402. In some examples, the agent installer 122 configures the monitoring agent 102 without intervention from a user. Example program 400 then ends.

FIG. 5 is a flowchart representative of example machine readable instructions 500 that may be executed to implement the example system 100 of FIG. 1 to automatically (e.g., without user intervention) install monitoring agents (e.g., a monitoring agent 102 of FIG. 1) on a computing unit (e.g., the example computing unit 104 of FIG. 1) in response to detecting installation of a multi-tiered application. Initially, at block 502, the example service rule definer 120 (FIG. 1) defines a service rule. In some examples, the service rule definer 120 defines a service rule after receiving input from the administrator 114 (FIG. 1) and/or the developer 116 (FIG. 1) (e.g., through the interface 300 of FIG. 3). At block 504, the example service analyzer 118 (FIG. 1) automatically (e.g., without user intervention) detects installation of a multi-tiered application on the computing unit 104 within a deployment environment (e.g., the example deployment environment 108 of FIG. 1).

At block 506, the example service analyzer 118 (FIG. 1) determines whether the multi-tiered application satisfies a service rule. In some examples, the multi-tiered application satisfies the service rule if the multi-tiered application corresponds to an identifier of multi-tiered application(s) to be monitored (e.g. the identifier 304 of FIG. 3) defined in the service rule. Additionally or alternatively, the multi-tiered application satisfies the service rule if the computing units 104 corresponding to the multi-tiered application is installed on corresponds to a computing units 104 specified by nodes and/or groups (e.g., as specified by the node field 306 and/or the group field 308 of FIG. 3) defined in the service rule. Additionally or alternatively, the multi-tiered application satisfies the service rule if the criteria (e.g., the criteria specified by the criteria field 310 of FIG. 3) defined by the service rule is met (e.g., the multi-tiered application is newly installed on the computing unit 104, etc.). If a service rule is satisfied, program control advances to block 508. Otherwise, if a service rule is not satisfied, program control returns to block 504.

At block 508, the service analyzer 118 detects services(s) and corresponding computing units 104 related to the installation of the multi-tiered application. In some examples, the service analyzer 118 receives an application definition (e.g., a list of the example services 117 and the example computing units 104 on which those services 117 were installed, etc.). In some examples, the service analyzer 118 causes example discovery scripts (e.g., the discovery scripts stored in the discovery script repository 126 of FIG. 1) to be executed on the computing units 104 in the example deployment environment 108 to discover relationships between the services 117 related to the multi-tiered application and the computing units 104 on which the services 117 are installed. At block 510, the service analyzer 118 selects the computing unit 104 detected at block 508.

At block 512, the service analyzer 118 determines whether a monitoring agent (e.g., the example monitoring agent 102 of FIGS. 1 and/or 2) is installed on the computing unit 104 selected at block 510. If the monitoring agent 102 is not installed on the computing device 104, program control advances to block 514. Otherwise, if the monitoring agent 102 is installed on the computing device 104, program control advances to block 516.

At block 514, without intervention from a user (e.g., the administrator 114 or the developer 116, etc.), the agent installer 122 (FIG. 1) initiates installation of the monitoring agent 102 on the computing unit 104 selected at block 510. Program control then advances to block 516.

At block 516, without intervention from a user (e.g., the administrator 114 or the developer 116, etc.), the agent installer 122 configures the monitoring agent 102 according to the configuration information 312-316 (FIG. 3) defined in the service rule defined at block 502. At block 518, the service analyzer 118 determines whether there is another one of the computing units 104 detected at block 508 that requires the monitoring agent 102 to be installed and/or configured. If there is another one of the computing units 104, program control returns to block 510. Otherwise, the example program 500 ends.

Figure 6:
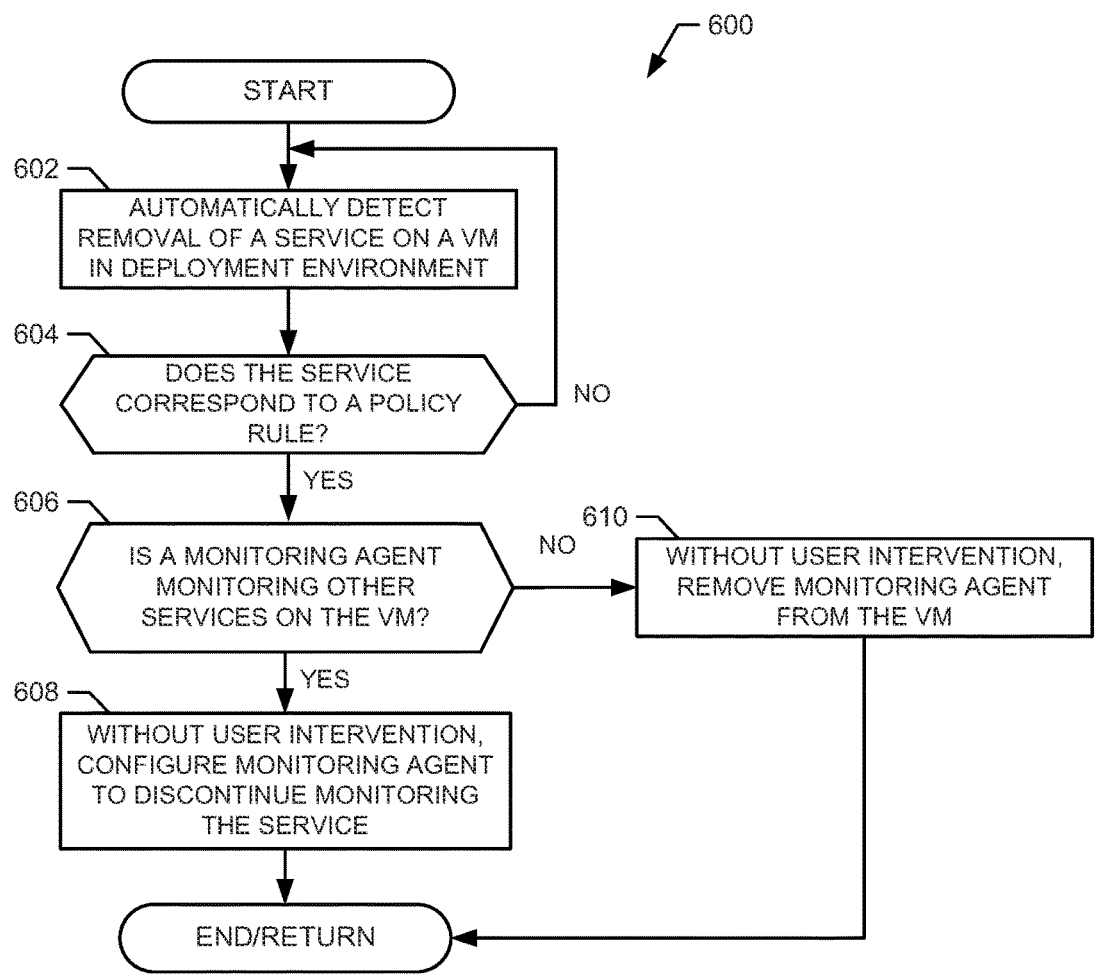
FIG. 6 is a flowchart representative of example machine readable instructions that may be executed to implement the system of FIG. 1 to automatically remove and/or reconfigure a monitoring agent when a service is removed from a computing unit.

FIG. 6 is a flowchart representative of example machine readable instructions 600 which may be executed to implement the example system 100 of FIG. 1 to automatically (e.g., without user intervention) remove and/or reconfigure a monitoring agent (e.g., the example monitoring agent 102 of FIGS. 1 and 2) when a service (e.g., the example service 117 of FIG. 1) is removed from a computing unit (e.g., the example computing unit 104 of FIG. 1). Initially, at block 602, the example service analyzer 118 (FIG. 1) automatically detects the removal of the service 117 from the computing device 104. At block 604, the service analyzer 118 determines whether the service 117 detected at block 602 satisfies a service rule. In some examples, the service 117 satisfies the service rule if the service corresponds to an identifier of a service to be monitored (e.g. the identifier 304 of FIG. 3) defined in the service rule. Additionally or alternatively, the service 117 satisfies the service rule if the computing unit 104 on which the service 117 was installed corresponds to the computing unit 104 specified by nodes and/or groups (e.g., the nodes 306 and/or the groups 308 of FIG. 3) defined in the service rule. Additionally or alternatively, the service 117 satisfies the service rule if the criteria (e.g., the criteria specified by the criteria field 310 of FIG. 3) defined by the service rule is met (e.g., the service rule allows for removal of a monitoring agent 102, etc.). If the service 117 satisfies the service rule, program control advances to block 606. Otherwise, if the service 117 does not satisfy the service rule, program control returns to block 602.

At block 606, the service analyzer 118 determines whether the monitoring agent 102 installed on the computing unit 104 detected at block 602 is monitoring another service. If the monitoring agent 102 is monitoring another service, then program control advances to block 608. Otherwise, if the monitoring agent 102 is not monitoring another service, program control advances to block 610.

At block 608, the agent installer 122 (FIG. 1) initiates reconfiguration of the monitoring agent 102 to remove configuration information (e.g., the configuration information 312-316) related to the removed service 102 according to the service rule. In some examples, the agent installer 122 initiates the reconfiguration of the monitoring agent 102 without intervention from a user (e.g., an administrator 114 and/or a developer 116 of FIG. 1, etc.). The example program 600 of FIG. 6 then ends.

At block 610, the agent installer 122 initiates removal of the monitoring agent 102 from the computing unit 104 detected at block 602. In some examples, the agent installer 122 initiates removal of the monitoring agent without intervention from the user. The example program 600 of FIG. 6 then ends.

Figure 7:
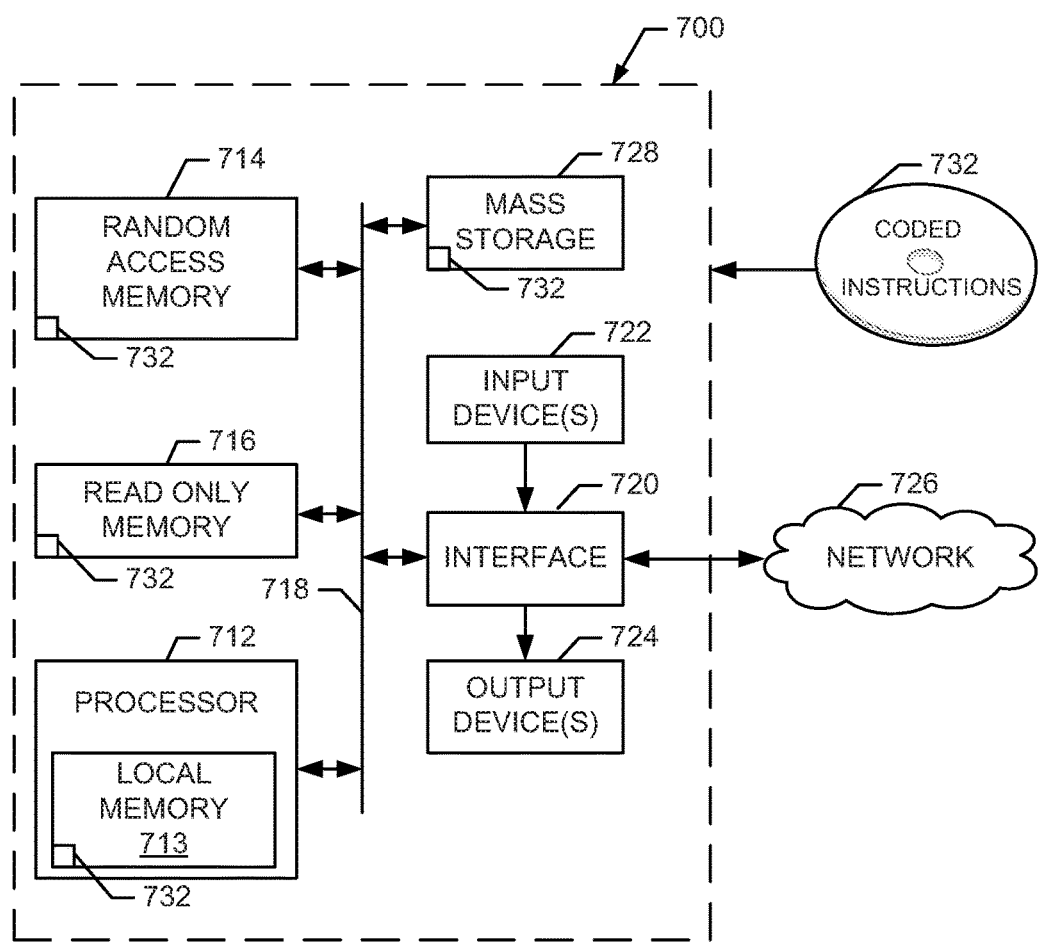
FIG. 7 is a block diagram of an example processor platform capable of executing the instructions of FIGS. 4, 5, and/or 6 to implement the system of FIG. 1.

FIG. 7 is a block diagram of an example processor platform 800 capable of executing the instructions of FIGS. 4, 5, and/or 6 to implement the example system 100 of FIG. 1. The processor platform 700 can be, for example, a server, a personal computer, or any other type of computing device.

The processor platform 700 of the illustrated example includes a processor 712. The processor 712 of the illustrated example is hardware. For example, the processor 712 can be implemented by one or more integrated circuits, logic circuits, microprocessors or controllers from any desired family or manufacturer.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), and/or a PCI express interface.

In the illustrated example, one or more input devices 722 are connected to the interface circuit 720. The input device(s) 722 permit(s) a user to enter data and commands into the processor 812. The input device(s) can be implemented by, for example, a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 720 of the illustrated example, thus, typically includes a graphics driver card, a graphics driver chip or a graphics driver processor.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.).

The processor platform 700 of the illustrated example also includes one or more mass storage devices 728 for storing software and/or data. Examples of such mass storage devices 728 include floppy disk drives, hard drive disks, compact disk drives, Blu-ray disk drives, RAID systems, and digital versatile disk (DVD) drives.

The coded instructions 732 of FIGS. 4, 5, and/or 6 may be stored in the mass storage device 728, in the volatile memory 714, in the non-volatile memory 716, and/or on a removable tangible computer readable storage medium such as a CD or DVD.

From the foregoing, it will be appreciate that examples disclosed herein dynamically (e.g., without intervention from a user) scale monitoring of services executing on virtual machines implementing multi-tiered applications. In such examples, user error and oversight are minimized by detecting installation of important services so that, for example, the important services are monitored in the dynamic environment.

Although examples herein disclose managing monitoring agents without user intervention, alternatively, some limited user intervention (e.g., entering credentials, starting and/or stopping the automated installation of monitoring agents, starting and/or stopping automation software, starting and/or stopping automated services, starting and/or stopping computing devices, etc.) may be used without departing from the scope of the disclosure. For example, a user may intervene to start the VIN 112 of FIG. 1 which may then monitor the computing unit(s) 104 (FIG. 1) in the deployment environment 108 (FIG. 1) and install and/or remove the monitoring agent 102 (FIG. 1 and/or 2) without user intervention.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method to manage a dynamic deployment environment including one or more virtual machines, the method comprising:
   (a) automatically scanning, by executing a computer readable instruction with a processor, the virtual machines in the deployment environment to identify a service installed on any of the virtual machines;
   (b) automatically determining, by executing a computer readable instruction with the processor, whether the identified service corresponds to a service monitoring rule;
   (c) when the service corresponds to the service monitoring rule, automatically determining, by executing a computer readable instruction with the processor, whether a monitoring agent identified by the service monitoring rule is installed on the one or more virtual machines on which the service is installed;
   (d) when the monitoring agent identified by the service monitoring rule is not installed on at least one of the one or more virtual machines on which the service is installed, automatically installing, by executing a computer readable instruction with the processor, the monitoring agent on the at least one of the virtual machines on which the service is installed; and (e) when the monitoring agent identified by the service monitoring rule is installed on the at least one of the virtual machines on which the service is installed, automatically configuring the monitoring agent, by executing a computer readable instruction with the processor, to monitor the service in accordance with the service monitoring rule on the at least one of the virtual machines on which the service is installed, wherein (a), (b), (c), (d) and (e) are repeatedly performed without human intervention.

2. The method as defined in claim 1, wherein the monitoring agent is a first monitoring agent, the service is a first service, and further including:

(f) automatically detecting, by executing a computer readable instruction with the processor, a second monitoring agent installed on at least one of the virtual machines;

(g) automatically determining, by executing a computer readable instruction with the processor, whether the second monitoring agent is monitoring any service;

(h) when the second monitoring agent is not monitoring any service, automatically removing, by executing a computer readable instruction with the processor, the second monitoring agent from the at least one virtual machine; and (i) when the second monitoring agent is monitoring a second service but not the first service, automatically configuring, by executing a computer readable instruction with the processor, the second monitoring agent to monitor the first service, wherein (f), (g), (h), and (i) are repeatedly performed without human intervention.

3. The method as defined in claim 1, further including, when the service is not installed on any of the one or more of the virtual machines and the monitoring agent is installed on one or more virtual machines, initiating removal of the monitoring agent corresponding to the service from the one or more virtual machines without user intervention.

4. The method as defined in claim 1, wherein the scanning of the virtual machines occurs in response to detecting a configuration change of at least one of the virtual machines.

5. The method as defined in claim 4, wherein the detecting of the configuration change includes executing a discovery script on the virtual machines.

6. The method as defined in claim 1, wherein the scanning is performed by a service analyzer separate from the virtual machines.

7. The method as defined in claim 1, wherein the monitoring agent collects performance data for the service, tracks events generated by the service, and allows a user to start and stop the service from a virtual machine monitor.

8. The method as defined in claim 1, wherein the service monitoring rule defines metrics used by the monitoring agent to monitor the service.

9. A system to manage a dynamic deployment environment including one or more virtual machines, the system, comprising:

a service analyzer to repeatedly, without human intervention:

automatically scan the virtual machines in the deployment environment to identify a service installed on any of the virtual machines;

automatically determine whether the identified service corresponds to a service monitoring rule;

when the service corresponds to the service monitoring rule, automatically determine whether a monitoring agent identified by the service monitoring rule is installed on the one or more virtual machines on which the service is installed; and an agent installer to:

when the monitoring agent identified by the service monitoring rule is not installed on at least one of the virtual machines on which the service is installed, automatically install the monitoring agent on the at least one of the virtual machines on which the service is installed; and when the monitoring agent identified by the service monitoring rule is installed on the at least one of the virtual machines on which the service is installed, automatically configure the monitoring agent to monitor the service in accordance with the service monitoring rule on the at least one of the virtual machines on which the service is installed.

10. The system as defined in claim 9, wherein the monitoring agent is a first monitoring agent, the service is a first service, and the service analyzer is to repeatedly, without human intervention:

automatically detect a second monitoring agent installed on at least one of the virtual machines;

automatically determine whether the second monitoring agent is monitoring any service; and the agent installer is to:

when the second monitoring agent is not monitoring any service, automatically remove the second monitoring agent from the at least one virtual machine; and when the second monitoring agent is monitoring a second service but not the first service, automatically configure the second monitoring agent to monitor the first service.

11. The system as defined in claim 9, wherein the service analyzer is to scan the virtual-machines in response to detecting a configuration change of at least one of the virtual machines.

12. The system as defined in claim 11, wherein the service analyzer is to detect the configuration change by executing a discovery script on the virtual machines.

13. The system as defined in claim 9, wherein the service monitoring rule defines metrics used by the monitoring agent to monitor the service.

14. The system as defined in claim 9, wherein the service analyzer and the agent installer are separate from the virtual machines.

15. The system as defined in claim 9, wherein the monitoring agent is to collect performance data for the service, to track events generated by the service, and to allow a user to start and stop the service from a virtual machine monitor.

16. A tangible computer readable storage medium comprising computer readable instructions which, when executed, cause a processor to by at least:

(a) automatically scan one or more of a plurality of virtual machines in a dynamic deployment environment to identify a service installed on any of the virtual machines;

(b) automatically determine whether the identified service corresponds to a service monitoring rule;

(c) when the service corresponds to the service monitoring rule, automatically determine whether a monitoring agent identified by the service monitoring rule is installed on the one or more virtual machines on which the service is installed;

(d) when the monitoring agent identified by the service monitoring rule is not installed on at least one of the one or more virtual machines on which the service is installed, automatically install the monitoring agent on the at least one of the virtual machines on which the service is installed; and (e) when the monitoring agent identified by the service monitoring rule is installed on the at least one of the virtual machines on which the service is installed, automatically configure the monitoring agent to monitor the service in accordance with the service monitoring rule on the at least one of the virtual machines on which the service is installed, wherein (a), (b), (c), (d) and (e) are repeatedly performed without human intervention.

17. The tangible computer readable storage medium as defined in claim 16, wherein the monitoring agent is a first monitoring agent, the service is a first service, and the instructions further cause the processor to:

(f) automatically detect a second monitoring agent installed on at least one of the virtual machines with the service analyzer;

(g) automatically determine whether the second monitoring agent is monitoring any service with the service analyzer;

(h) when the second monitoring agent is not monitoring any service, automatically remove the second monitoring agent from the at least one virtual machine with the agent installer; and (i) when the second monitoring agent is monitoring a second service but not the first service, automatically configure, with the agent installer, the second monitoring agent to monitor the first service, wherein (f), (g), (h), and (i) are repeatedly performed without human intervention.

18. The tangible computer readable storage medium as defined in claim 16, wherein the service monitoring rule defines metrics used by the monitoring agent to monitor the service.

* * * * *